United States Patent
Desarda et al.

(10) Patent No.: US 11,190,502 B2
(45) Date of Patent: Nov. 30, 2021

(54) AUTOMATED SINGLE SIGN-ON CONFIGURATION FOR SERVICE PROVIDERS

(71) Applicant: MICROSOFT TECHNOLOGY LICENSING, LLC., Redmond, WA (US)

(72) Inventors: Jeevan Suresh Desarda, Seattle, WA (US); Arvind Harinder, Seattle, WA (US); Mayukh Ray, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 470 days.

(21) Appl. No.: 16/138,973

(22) Filed: Sep. 22, 2018

(65) Prior Publication Data
US 2020/0099676 A1    Mar. 26, 2020

Related U.S. Application Data

(60) Provisional application No. 62/734,241, filed on Sep. 20, 2018.

(51) Int. Cl.
*H04L 29/06* (2006.01)
*G06F 16/958* (2019.01)
*G06F 40/14* (2020.01)

(52) U.S. Cl.
CPC ........ *H04L 63/0815* (2013.01); *G06F 16/986* (2019.01); *G06F 40/14* (2020.01)

(58) Field of Classification Search
CPC .................................................. H04L 63/0815
See application file for complete search history.

(56) References Cited

U.S. PATENT DOCUMENTS

| 8,955,080 | B2* | 2/2015 | Brunswig | G06F 21/41 726/8 |
| 10,423,709 | B1* | 9/2019 | Bradley | G06F 40/16 |
| 2002/0147847 | A1* | 10/2002 | Brewster | G06F 40/14 709/246 |
| 2013/0160105 | A1 | 6/2013 | Huang et al. | |

(Continued)

FOREIGN PATENT DOCUMENTS

EP    3047628 A1    7/2016

OTHER PUBLICATIONS

Hunt, et al., "Selenium Documentation", Retrieved From: https://scholar.harvard.edu/files/tcheng2/files/selenium_documentation_0.pdf, Aug. 26, 2012, 201 Pages.

(Continued)

*Primary Examiner* — Ponnoreay Pich (57) ABSTRACT

An identity provider, within a directory service, provides an automatic technique for configuring the single sign-on settings of a service provider. The directory service contains pre-configured templates for each service provider supported by the directory service which include the details of the service provider's SSO configuration settings web page. A configuration sign-on script is generated to automatically fill in the configuration settings so that the principal can perform single sign-on with the service provider's preferred authentication and authorization protocol.

20 Claims, 9 Drawing Sheets

(56) References Cited

U.S. PATENT DOCUMENTS

| | | | | |
|---|---|---|---|---|
| 2014/0013387 A1* | 1/2014 | Vangpat | .............. | H04L 63/0815 |
| | | | | 726/2 |
| 2015/0089579 A1* | 3/2015 | Manza | .................... | H04L 63/20 |
| | | | | 726/1 |
| 2016/0021097 A1* | 1/2016 | Shrotri | ................ | H04L 63/0815 |
| | | | | 726/8 |
| 2020/0076792 A1* | 3/2020 | Ray | ....................... | H04L 63/083 |

OTHER PUBLICATIONS

"International Search Report and Written Opinion Issued In PCT Patent Application No. PCT/US19/039672", dated Sep. 9, 2019, 13 Pages.

\* cited by examiner

AUTOMATED SINGLE SIGN-ON CONFIGURATION FOR SERVICE PROVIDERS

CROSS-REFERENCE TO RELATED APPLICATION

This application claims the benefit of U.S. Provisional Application No. 62/734,241 filed on Sep. 20, 2018.

BACKGROUND

A network directory service system controls access to network resources by authenticating the identity of the end users requesting access to the devices, applications, and/or services (i.e., resources) controlled by the network directory service. The network directory service system may utilize an identity management system that authenticates each end user that initiates a sign-on or log-in to access a resource controlled by the network directory service system. The sign-on process may be initiated by a browser that signs-on or logs-in to a web-based resource using a set of credentials (e.g., user name, password, fingerprint scan, retina scan, voice print, etc.). Upon authentication of the user's credentials, a user session is initiated. In the case where an end user accesses multiple resources within a single security context, a single sign-on process may be used to enable the end user, within the same user session, to access multiple web-based resources using a single set of credentials. The single sign-on process authenticates the identity of an end user for all resources that the end user is authorized to access.

The single sign-on process in a multiple security context is more complicated since each security context may utilize a different authentication and authorization protocol that may not communicate with the authentication and authorization protocol of another context. In order to promote interoperability, a standard protocol for exchanging authentication and authorization data between different parties is often used. The protocol may define the syntax and semantics of a security assertion, the protocol used to request and transmit the assertion, the manner in which a request and response are mapped onto standard communication protocols, and so forth. However, the complexity of the protocol creates challenges for an administrator in configuring a single sign-on process that is outside of its security context.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A directory service provides an automated mechanism for a principal to automatically configure the single sign-on settings of a service provider's authentication and authorization protocol. The directory service generates a configuration sign-on script that is customized for the authentication and authorization protocol utilized by a service provider. The configuration sign-on script is executed in a browser to fill in the requisite configuration settings needed for the identity provider to facilitate single sign-on with the service provider using the service provider's preferred authentication and authorization protocol.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a mechanism for an identity provider to facilitate the automation of the configuration of the single sign-on (SSO) settings of a service provider.

A single sign-on is a session and user authentication that allows a user to access multiple web applications with one set of login credentials. In order to accomplish single sign-on, the service provider has to be configured to enable the single sign-on process. Each service provider may utilize a different protocol for its sign-on or login-in process. A standard protocol is often used to support interoperability between different security contexts, such as the security context of the identity provider and the security context of the service provider. A security context is the protocol used for the exchange of authentication and authorization information between two networked computers. Examples of such authentication and authorization protocols include Security Assertion Markup Language (SAML), OpenID Connect, Facebook Connect, OAuth, etc.

However, in order for single sign-on to operate, the service provider has to be configured with the correct configuration settings of the desired authentication and authorization protocol. This is typically provided by an administrator of the principal manually for each service provider that the directory service engages with on behalf of the principal. There are typically several service providers and each service provider may utilize a different authentication and authorization protocol. This requires the administrator to understand the technical specifications needed to configure each protocol which may not always be possible. It also requires that the administrator to manually configure the settings for each service provider which may be a burdensome task.

In order to overcome these drawbacks, the present disclosure provides a mechanism to automate the configuration process. Attention now turns to a description of a system for the automatic configuration of a single sign-on process of a service provider.

Automated Single Sign-on (SSO) Configuration System

Figure 1A:
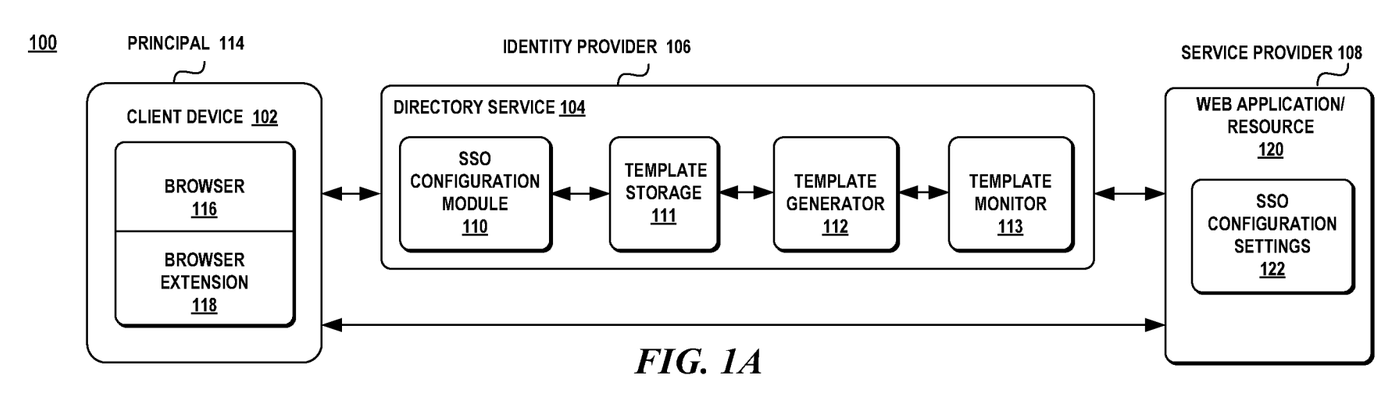
FIG. 1A illustrates a first exemplary system of an automated configuration of the single sign-on setting of a service provider.

Turning to FIG. 1A, there is shown a first exemplary system 100 embodying the automated SSO configuration process. The system 100 includes one or more client devices 102 communicatively coupled to a directory service 104 through a network, such as the Internet using the HyperText Transfer Protocol (HTTP). In one aspect, the directory service 104 is an identity provider 106 that provides access control and identity management for the applications and resources associated with an organization, entity, and/or end user. The directory service 104 offers identity management and single sign-on to multiple web-based Software as a Service (SaaS) applications, otherwise referred to as service providers 108. Examples of a directory service 104 include, without limitation, Microsoft Azure Active Directory, Amazon Web Services, Google Cloud Platform, and the like.

The directory service 104 may include a single sign-on (SSO) configuration module 110, a template storage 111, a template generator 112, and a template monitor 113. A template contains the layout of the service provider's SSO configuration web page and/or user interface, and the requisite data and instructions needed to fill in the settings presented in a SSO configuration web page.

The principal 114 is a user, entity or organization that requests access to a resource from the service provider 108 through the identify provider 106. The principal 114 is associated with a client device 102 having a browser 116 and a browser extension 118. In one aspect of the disclosure, a remote or web-based authentication endpoint is registered with the client device 102, browser 116, or the browser extension 118. The web-based authentication endpoint is a port in which the client device 102 connects to the directory service 104. The endpoint is the uniform resource locator (URL) that the client device 102 or browser extension 118 uses to access the directory service 104. The browser extension 118 may be an add-on module, extension, plug-in module, or the like that extends the functionality of the browser 116 to interact with the directory service 104.

The SSO configuration module 122 generates a sign-on script for the browser extension 116 to use to sign-on to an intended application or resource 120. The sign-on script may be written in a scripting language (e.g., JavaScript, HTML, ECMAScript, JSON, etc.), programming language or combination thereof. The sign-on script is used by the browser extension 116 to invoke the service provider 108 of the intended application or resource, facilitate an administrator session with the intended resource, fill in the configuration settings for SSO, respond to requests from the service provider, handle error conditions, and facilitate successful operation of the sign-on configuration process.

The template storage 111 stores templates and configuration data for each of the service providers. A template contains the specifications of the layout of the web page or user interface that is used by a service provider to obtain the configuration settings. The template contains the details of the HTML elements, CSS elements, layout of the elements, fields, boxes, etc. used in the web page or user interface and the navigation details of the service provider's administration module. A browser plug-in may include a website copier that copies the markup, style sheets, script, and resources from a web page. This data is then used by the template generator to generate a template for the service provider that details the layout of the service provider's configuration SSO web page.

A service provider 108 may include one or more servers that host one or more web applications or resources 120. The service provider 108 stores SSO configuration settings 122 for the web applications and/or resource 120 hosted by the service provider 108.

In this first exemplary system, the identity provider generates a single sign-on script customized for a service provider which is executed by the browser extension 118. However, in some instances, the SSO configuration settings are configured by an administrator of the principal. This is often the case when the principal is an entity or organization that uses an administrator (i.e., Information Technology (IT) administrator, system administrator, etc.) to perform the configuration of the SSO settings. An administrator is a role designated for the person or persons who are responsible for the upkeep, management and reliability of the computer systems for an organization or entity. In this scenario, the administrator has to sign-on manually to the service provider before the configuration sign-on script is executed since the identity provider does not maintain the administrator's sign-on credentials for the service provider.

Figure 1B:
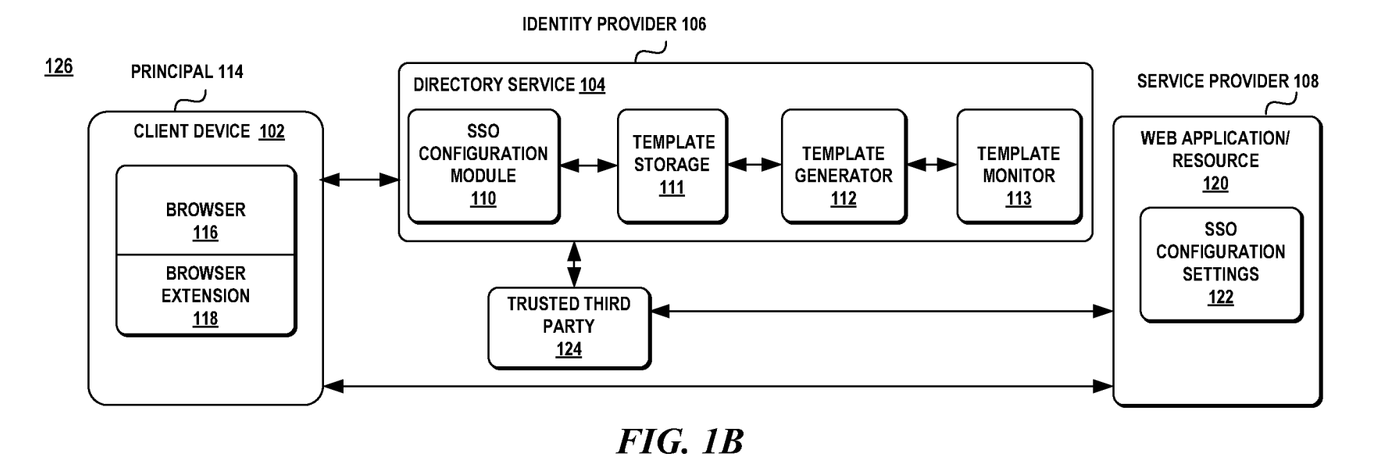
FIG. 1B illustrates a second exemplary system of an automated configuration of the single sign-on setting for a service provider.

FIG. 1B illustrates a second exemplary system 126 of the present disclosure where the system 126 utilizes a trusted third party 124 to perform the administrator's sign-in to the service provider 108 before execution of the configuration sign-on script. In this manner, the configuration sign-on script may be executed without manual intervention by the administrator where the administrator is not authorized to access the service provider's administrator web site and has to utilize another administrator to perform the configuration on their behalf. The system 126 utilizes the same components shown above in FIG. 1A and includes the trusted third party 124. A trusted third party 124 is an entity which facilitates interactions between two parties who have an established trust with the trusted third party 124. The principal 114 and the service provider 108 have an established trust with the trusted third party 124 so that the trusted third party 124 can sign-on to the service provider 108 as the administrator.

There are various techniques that may be used to establish trust between two parties and any such technique may be used. The trust may be implemented in cryptographic digital transactions as well as cryptographic protocols. A certificate authority may be used to issue a digital identity certificate to each party which is then used in the communications between each party in the trusted relationship.

Although FIGS. 1A-1B depicts the system and process in a particular configuration, it should be noted that the subject matter disclosed herein is not constrained to the configuration shown in FIG. 1. For example, the client device 102 may utilize a rich client application rather than a browser to interact with the directory service. A rich client application is an application on a computing device that retrieves data from the Internet without the use of a browser.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
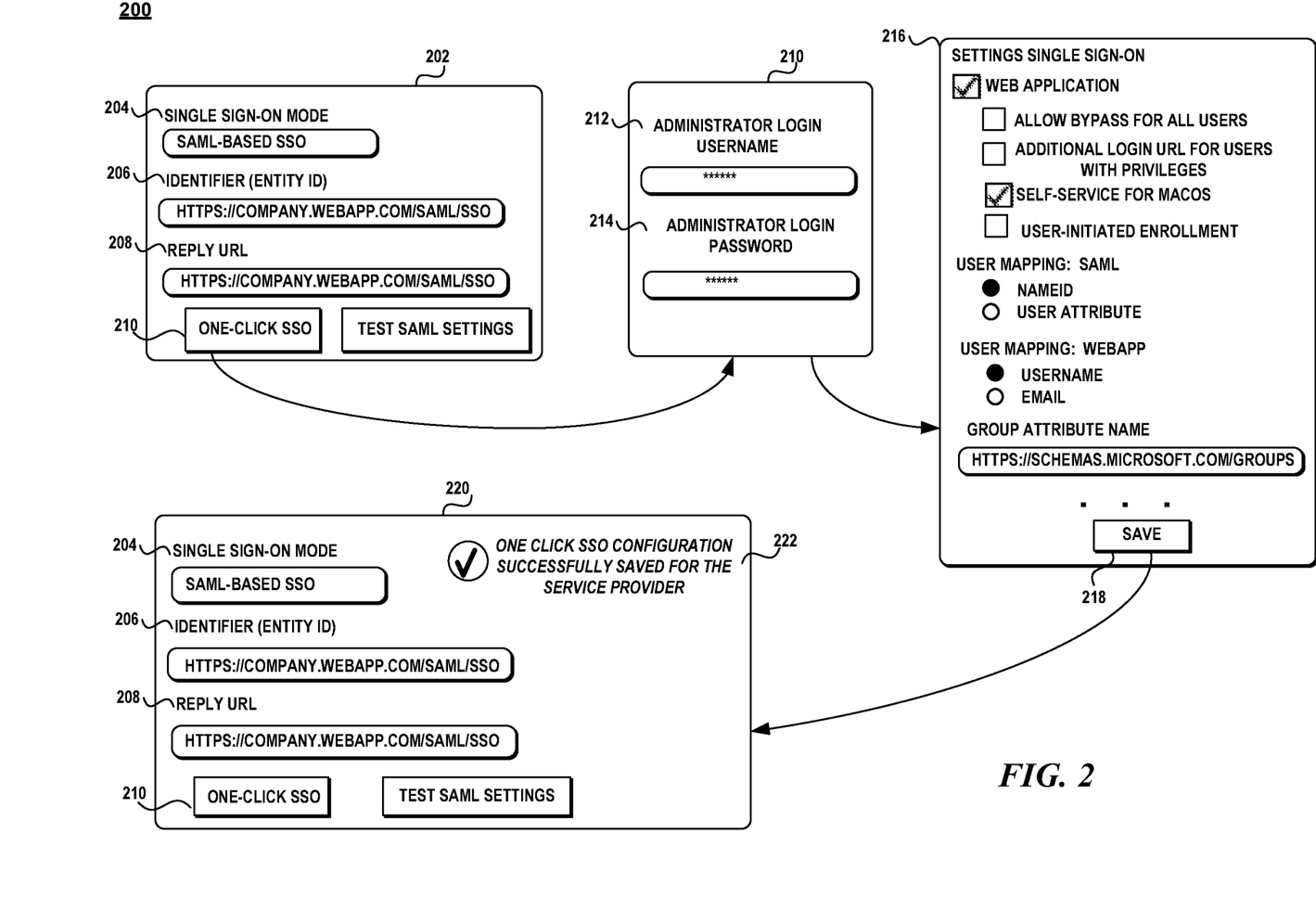
FIG. 2 is a schematic diagram illustrating an exemplary process of configuring SAML settings for a service provider in a first aspect of the disclosure.
Figure 3:
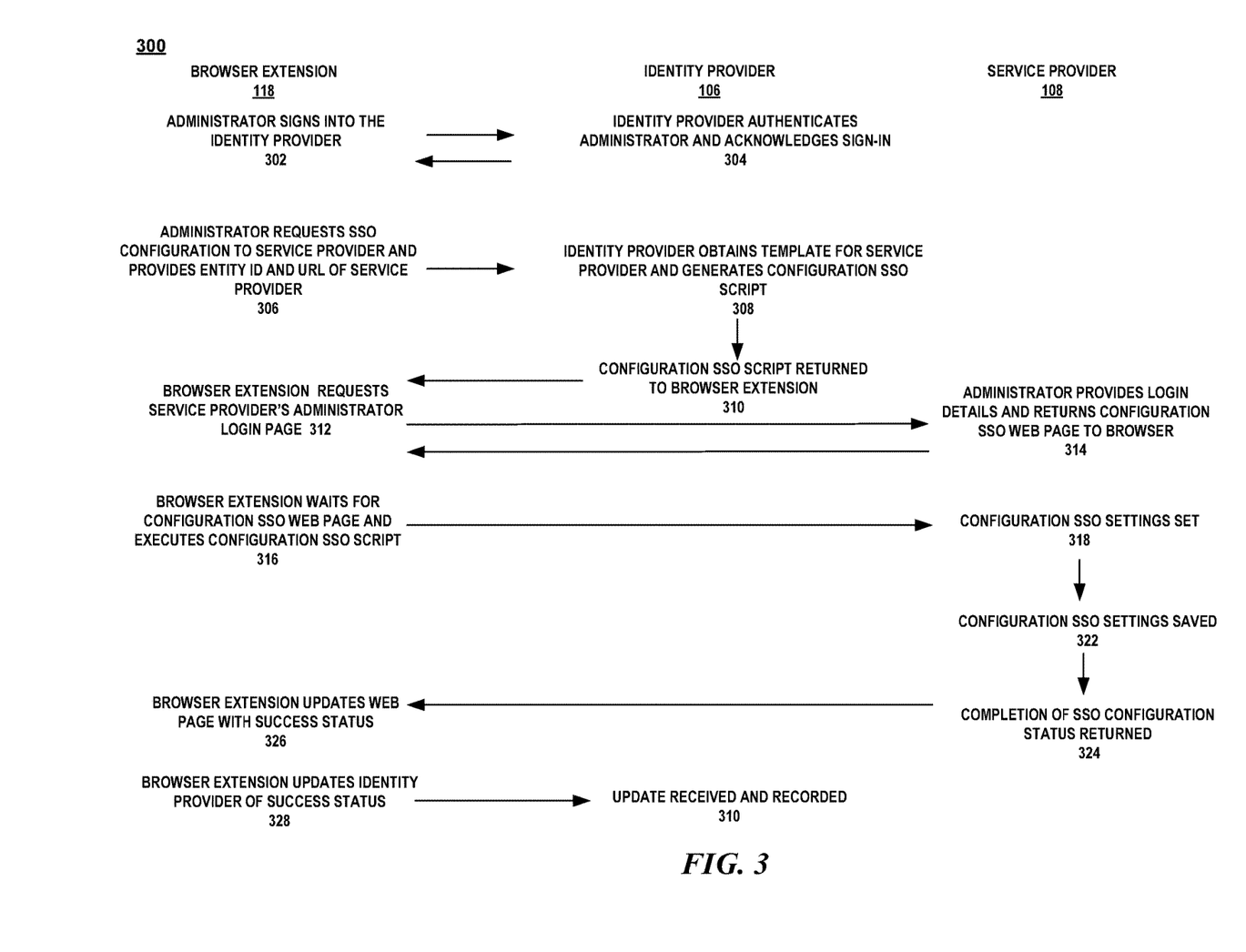
FIG. 3 is a flow diagram illustrating a first exemplary method used to perform an automated configuration of single sign-on settings in the first aspect of the disclosure.

FIGS. 2 and 3 illustrate an exemplary method 200 of a first aspect of the automated configuration single sign-on process. Initially, the administrator of the principal signs on to the directory service (block 302) and the identity provider 106 authenticates the administrator and acknowledges the successful sign-on (block 304). At some point thereafter, the administrator, through the browser extension 118, requests that the identity provider 106 configure the SSO settings of a service provider 108 (block 306). The identity provider provides the administrator, through the browser extension 118, a web page 202 to initiate the configuration.

As shown in FIG. 2, the web page 202 obtains the single sign-on mode 204, the entity identifier of the service provider 206, and a reply URL 208 from the administrator. The single sign-on mode 204 indicates the SSO protocol used by the service provider, the entity identifier 206 designates the globally unique name of the service provider, and the reply URL 208 specifies where to redirect after the sign-on configuration is completed. Once the administrator fills in these fields 204, 206, 208, the administrator clicks the One-Click SSO button 210 to initiate the automatic sign-on configuration process.

In response to the initiation of the One-Click SSO button 210, the entity provider 206 and the reply URL 208 are then transmitted to the identity provider 106 which generates a configuration sign-on script for the service provider identified by the entity provider (block 308). The configuration sign-on script is generated from a template associated with the service provider 108 and contains the layout of the service provider's SSO configuration web page and the fields that need to be filled in to configure the SSO settings (block 308). The configuration sign-on script is transmitted to the browser extension 118 (block 310).

In order for the browser extension 118 to execute the configuration sign-on script, the administrator has to sign-in to the service provider 108 using the administrator's credentials. The browser extension 118 facilitates the request for the administrator's login at the service provider 108 (block 312). The administrator logins with the service provider (block 314) and the service provider returns an acknowledgement back to the browser extension along with the configuration SSO web page (block 314).

In some scenarios, the administrator's credentials are not shared with the identity provider for security concerns. As shown in FIG. 2, the browser extension receives the administrator login web page 210 for the administrator to fill in the administrator's credentials such as the administrator's login username 212 and the administrator's login password 214. The service provider authenticates the administrator and acknowledges the administrator's successful login by returning a session cookie or a session token back to the browser extension or the browser extension looks for elements to be filled regardless of whether they appear or not.

Upon the browser extension receiving acknowledgment of the administrator's login, the browser extension executes the configuration SSO script to obtain the web page that contains the configuration settings for SSO (block 316). The configuration SSO script fills in automatically the required settings for the particular protocol of choice (block 318).

For example, FIG. 2 shows an exemplary web page 216 for the configuration of SSO settings of a service provider. The exemplary web page 216 is for the configuration of the SAML SSO settings. The configuration SSO script automatically fills in the settings on the web page without manual intervention. The administrator may view the settings and click the save button 218 to indicate completion.

The configuration SSO settings are then saved at the service provider (block 322) and a status message is returned back to the browser extension (block 324). The browser extension receives the successful completion message and updates the browser web page with a successful completion status update (block 326) and provides the identity provider with the success status (block 328).

Referring to FIG. 2, there is shown the one-click SSO web page 220 with the successful completion status message 222. At this point, the automatic configuration SSO is completed for this service provider. The steps shown in FIGS. 2 and 3 may be repeated for other service providers.

Figure 4:
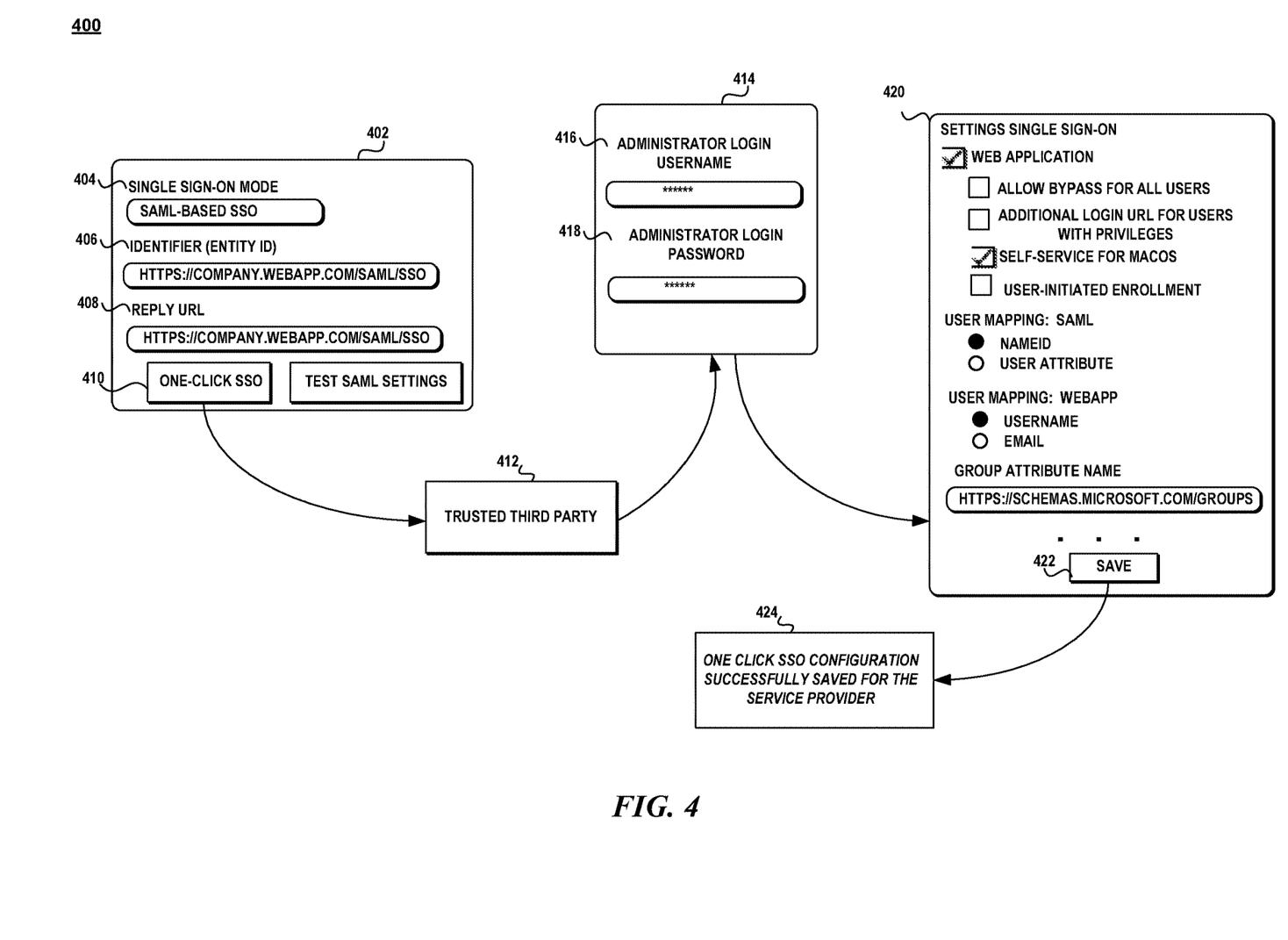
FIG. 4 is a schematic diagram illustrating an exemplary process of configuring SAML settings for a service provider through a trusted third party in a second aspect of the disclosure.

FIG. 4 illustrates an exemplary method 400 of a second aspect of the automated configuration single sign-on process. In this method 400, a trusted third party is used to perform the administrator's login to the service provider thereby eliminating the administrator's intervention for that task. As shown in FIG. 4, the identity provider provides a web page 402 that obtains the input needed to configure the SSO settings at the service provider. The input includes the single sign-on mode 404, the identifier 406, and the reply URL 408 as described above.

When the One-click SSO button 410 is activated, the input is sent to the identity provider which in turn generates a configuration sign-on script that is transmitted to the trusted third party 412. The trusted third party signs-in the administrator in the service provider through the service provider's administrator login 414 using the administrator's login credentials, 416, 418. The trusted third party 412 executes the configuration SSO script which fills in the configuration SSO settings 420 seamlessly. Once the SAVE button 442 is activated, a notification 424 is sent to the browser extension indicating successful completion.

Figure 5:
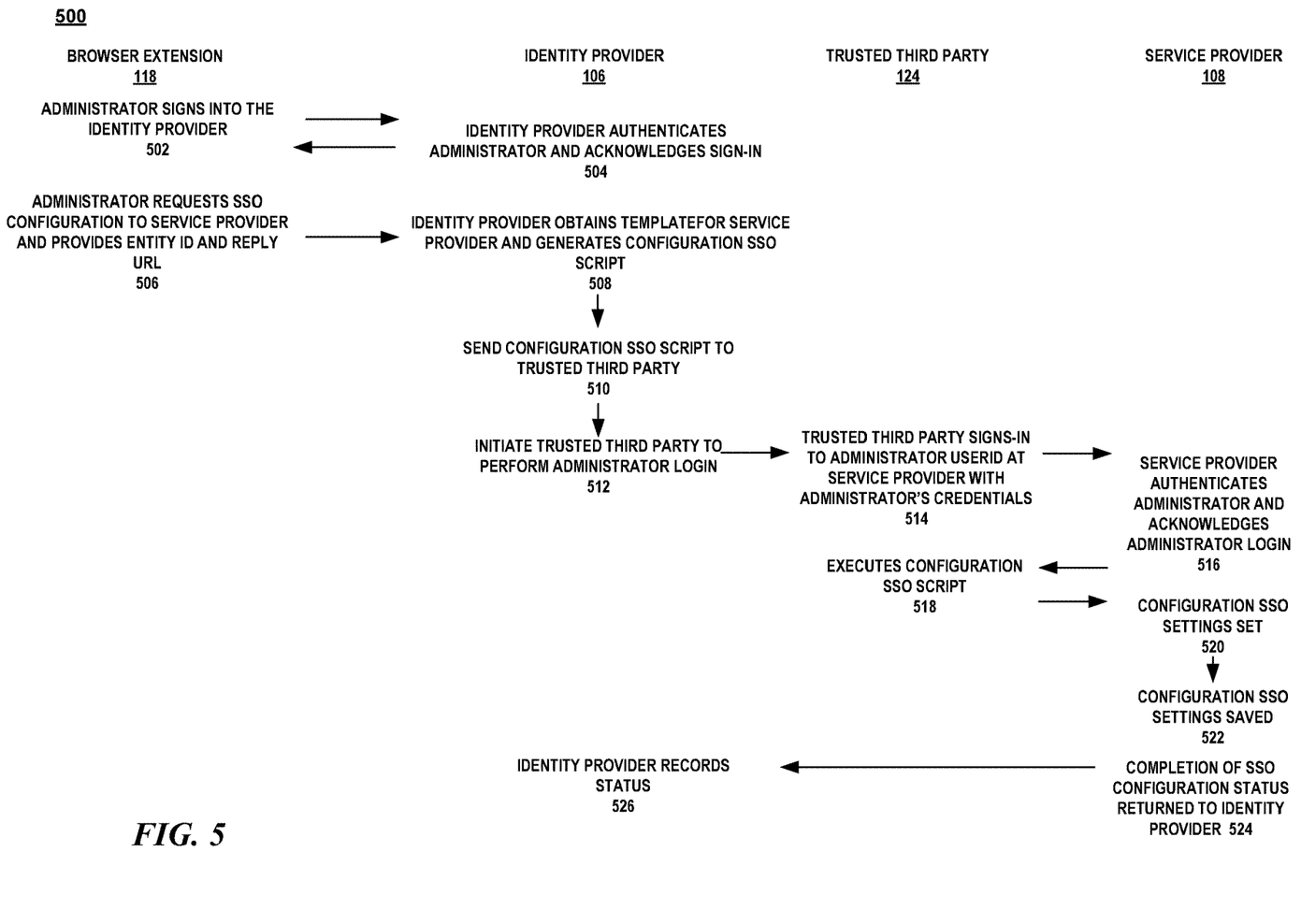
FIG. 5 is a flow diagram illustrating a second exemplary method used to perform an automated configuration of the single sign-on settings in the second aspect of the disclosure.

FIG. 5 illustrates the process shown in FIG. 4 in more detail. Initially, the administrator of the principal requests sign-on to the directory service (block 502) and the identity provider 106 authenticates the administrator and acknowledges the successful sign-on (block 504). At some point thereafter, the administrator, through the browser extension 118, requests that the identity provider 106 configure the SSO settings of a service provider and provides the entity id and reply URL to the identity provider 106 (block 506).

The identity provider 106 receives the request and obtains the stored sign-on configuration data and template for the service provider and generates a configuration SSO script (block 508). The configuration sign-on script is forwarded to the trusted third party 124 (block 510) and the identity provider 106 initiates the trusted third party 124 to perform the administrator login (block 512). The trusted third party 124 uses the administrator's credentials to sign into the administrator's account at the service provider 108 (block 514). The service provider 108 authenticates the trusted third party 124 acting as the administrator (block 516).

Once authenticated, the trusted third party 124 executes the configuration SSO script (block 518) which executes the requisite commands to fill in the SSO settings at the service provider 108 (block 520). The SSO configuration settings are saved (block 522), and a status is returned to the identify provider (block 524) which is recorded (block 526).

Figure 6:
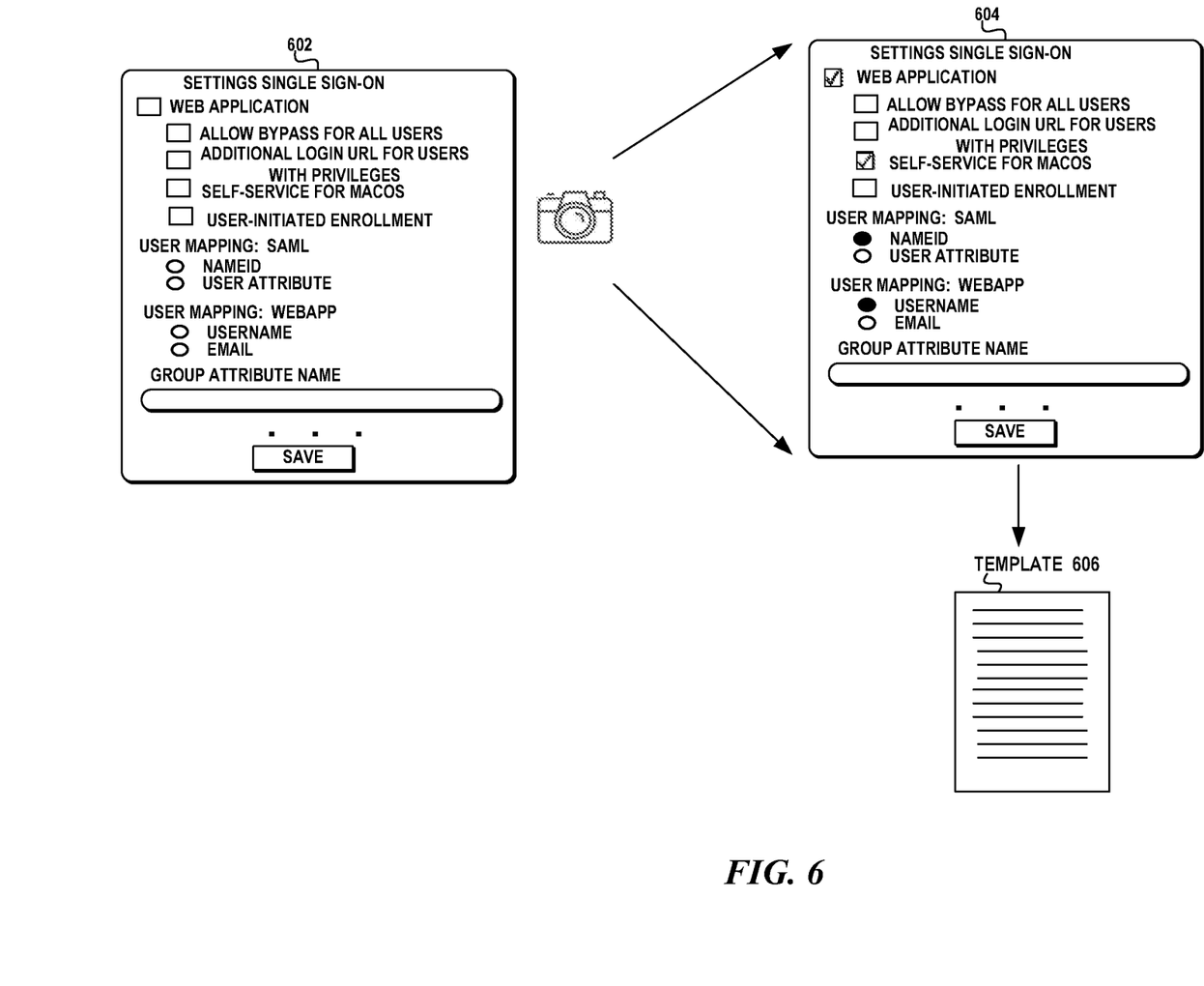
FIG. 6 is a schematic diagram illustrating the automatic generation of a template.
Figure 7:
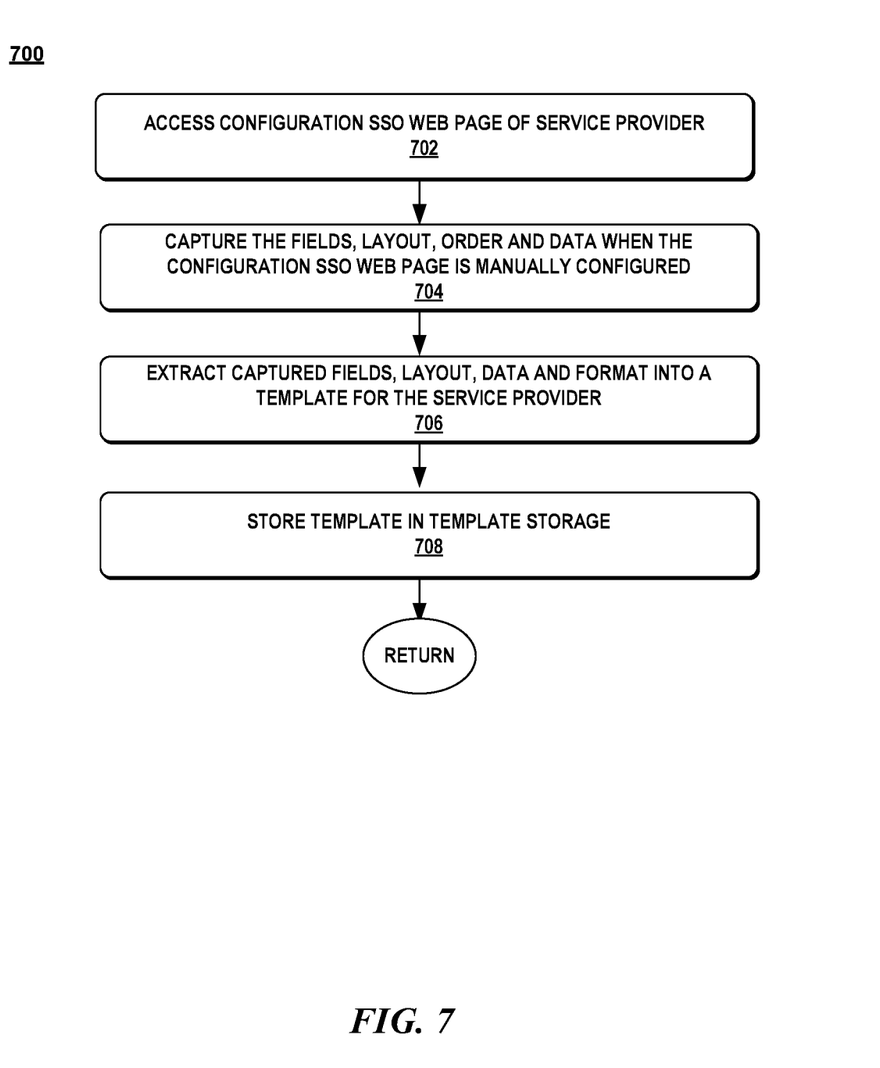
FIG. 7 is a flowchart illustrating an exemplary method of the automatic generation of the template.

FIGS. 6 and 7 illustrate the configuration of a template used to generate the configuration SSO script. Each service provider associated with the directory service may utilize a different web page or user interface to input the SSO settings. The identity provider utilizes a template for each service provider that describes the layout, fields, input, buttons, and other elements of the web page or user interface that is used to input the SSO settings for a particular service provider. The use of the templates is scalable allowing the identity provider to accommodate a large number of service providers in an efficient manner.

Referring to FIG. 7, there is shown an exemplary method 700 where in one aspect of the present disclosure, the identity provider through a browser accesses the configuration SSO web page of a service provider (block 702). The browser contains a plug-in or add-on module, such as a website copier or other web page inspection component, that has the capability of capturing the HTML and CSS elements in the web page that pertains to the layout, fields, and data used by the service provider. When the settings are manually configured in the configuration SSO web page, the browser is able to capture these settings as well (block 704). The data extracted from the SSO configuration web page is formatted into a template (block 706) and stored in the template storage 111 (block 708).

As shown in FIG. 6, a browser in the identity provider captures the SSO configuration data from a SSO configuration web page 602 when the SSO configuration web page is manually configured with a particular set of settings 604. The template generator 113 stores this data in a template 606 in the template storage 111.

Figure 8:
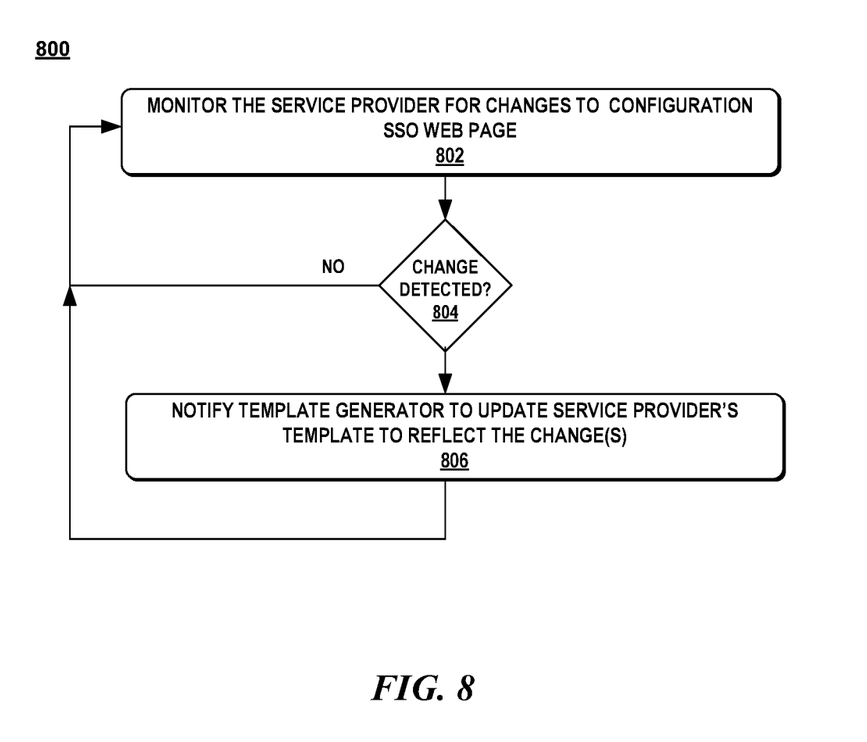
FIG. 8 is a flowchart illustrating an exemplary method for updating a template.

Referring to FIG. 8, there is shown an exemplary method 800 in one aspect of the disclosure of the template monitor 113. The template monitor 113 monitors for changes made to the service provider's configuration SSO web page (block 802). The template monitor 113 may capture the layout of the web page and compare it with the existing stored template. When a change is detected (block 804—yes), the template monitor 113 notifies the template generator 112 of the change so that the template generator 112 can modify the template to reflect the changes (block 806).

Exemplary Operating Environment

Figure 9:
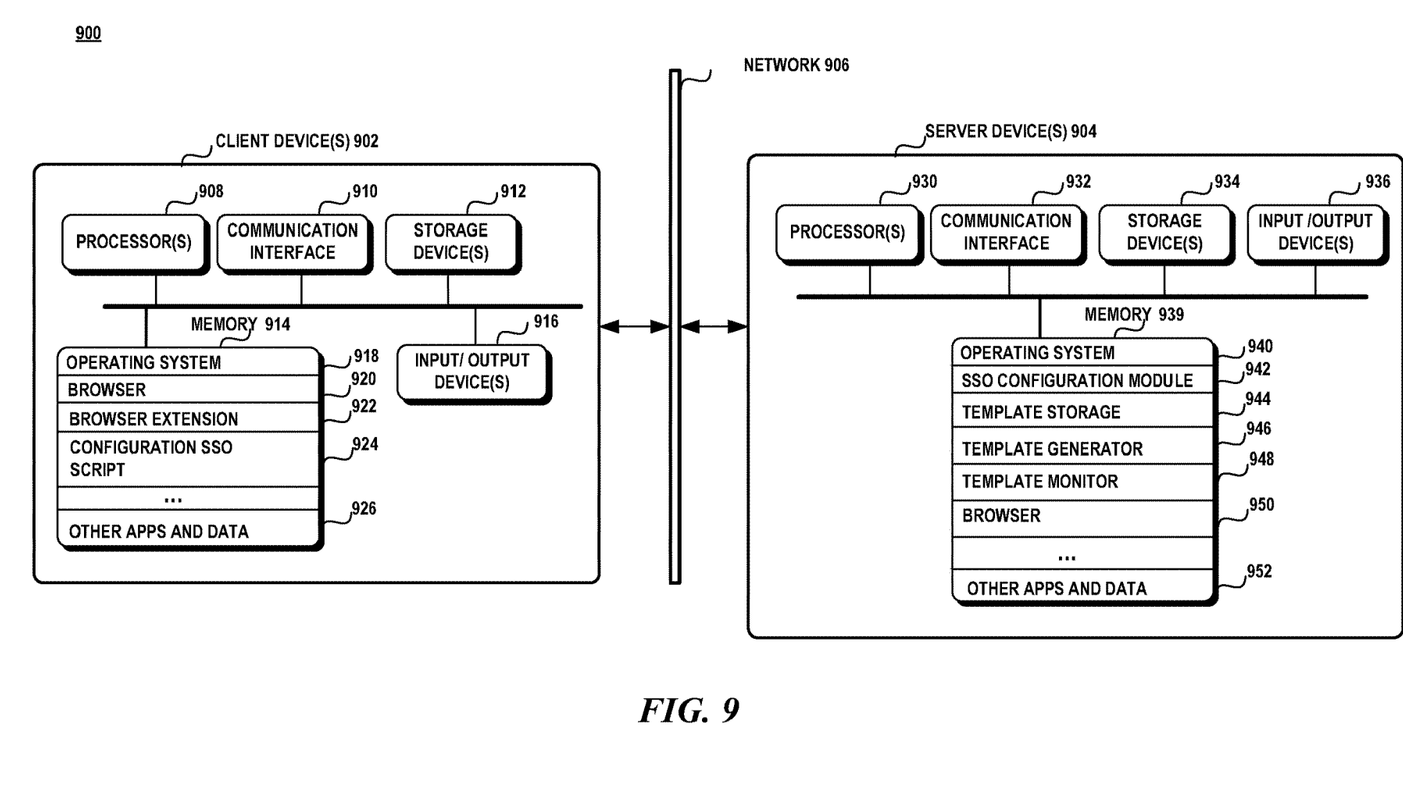
FIG. 9 is a block diagram illustrating an exemplary operating environment.

Attention now turns to FIG. 9 and a discussion of an exemplary operating environment 900. It should be noted that the operating environment 900 is exemplary and is not intended to suggest any limitation as to the functionality of the embodiments. The embodiments may be applied to an operating environment 900 having one or more client devices 902 coupled to one or more server devices 904 through network 906. The server devices 904 form a cloud service that is available on demand through the Internet.

The client devices 902 and the server devices 904 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A client device 902 may include one or more processors 908, a communication interface 910, one or more storage devices 912, a memory 914, and one or more input/output (I/O) devices 916. A processor 908 may be any commercially available processor and may include dual microprocessors and multi-processor architectures. The communication interface 910 facilitates wired or wireless communications between the client device 902 and other devices. The storage devices 912 may be computer-readable medium that do not contain propagating signals, such as modulated data signals transmitted through a carrier wave. Examples of the storage devices 912 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input/output (I/O) devices 916 may include a keyboard, mouse, pen, voice input device, touch input device, a display, speakers, printers, etc., and any combination thereof.

The memory 914 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 914 may also include one or more external storage devices or remotely located storage devices that do not pertain to propagated signals, such as modulated data signals transmitted through a carrier wave.

The memory 914 may contain instructions, components, modules, and data. A component is a software program that perform a specific function and is otherwise known as a module, application, and the like. The memory 914 may include an operating system 918, a browser 920, a browser extension 922, a configuration SSO script 924, and various other applications, components, and data 926.

A server device 904 also include one or more processors 930, a communication interface 932, one or more storage devices 934, I/O devices 936, and a memory 938 as described above. The memory 938 may include an operating system 940, a SSO configuration module 942, service provider configuration data and template storage 944, template generator 946, a template monitor 948, a browser 950 and other applications and data 952.

The network 906 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having at least one processor and a memory coupled to the at least one processor. The at least one processor is configured to: generate, by an identity provider, a configuration single sign-on (SSO) script to automatically configure the single sign-on settings of a service provider in a user interface, wherein the single sign-on settings are tailored for an authentication and authorization protocol utilized by the service provider, wherein the configuration SSO script is based on a template associated with the service provider, the template containing a layout of the user interface used to configure the single sign-on settings; and facilitate execution of the configuration SSO script to automatically configure the SSO settings in the service provider.

The authentication and authorization protocol uses the Security Assertion Markup Language (SAML) protocol. A browser extension executes the configuration SSO script in one aspect and in a second aspect, a trusted third party executes the configuration SSO script. The system is further configured to capture manual actions of a user inputting the single sign-on settings, and use the captured single sign-on settings in the template. In addition, the system can capture the layout of the user interface from a browser; and use the captured layout in the template. Upon successful completion of the configuration of the single sign-on settings in the service provider, the system provides notification of the successful completion. The system is able to monitor for a change made to the layout of the user interface; and upon detection of the change, update the template to reflect the change.

A device is disclosed having one or more processors communicatively connected to a memory. The memory includes instructions that when executed on the one or more processors perform actions that: store a plurality of templates, a template associated with a service provider, the template including information on a design of a web page, the web page including configuration settings of an authentication and authorization protocol used with the service provider; generate a configuration single sign-on (SSO) script for a select service provider based on a template associated with the select service provider, the configuration SSO script including instructions to automatically fill in the configuration settings on the rendered web page; and initiate execution of the configuration SSO script to a third party.

In one aspect, the third party is an administrator of a principal associated with the service provider and in another aspect, the third party is a trusted third party that executes the configuration SSO script on behalf to an administrator of a principal associated with the service provider. The authentication and authorization protocol is the SAML protocol. The memory includes further instructions that update a template upon detection of a change made to the design of the web page.

A method is disclosed that utilizes the device and system presented herein. The method comprises detecting, at an identity provider including at least one processor and a memory, a layout of a configuration single sign-on (SSO) web page of a service provider, the layout including at least one HTML element and at least one CSS element, the configuration SSO web page of the service provider including settings for an authentication and authorization protocol between the identity provider and the service provider; generating a template including the layout; creating a configuration SSO script using the template, the configuration SSO script including instructions that automatically fill in settings rendered in the configuration SSO web page; monitoring for at least one change to the template; and upon detection of the at least one change, updating the template.

The method further comprises transmitting the configuration SSO script to a principal of the identity provider for execution, prior to executing the configuration SSO script, enabling administrator access to the service provider, and transmitting the configuration SSO script to a trusted third party to execute the configuration SSO script. The trusted third party acts on behalf of an administrator of a principal who is associated with the identity provider. The settings are associated with the SAML protocol. The settings require configuration from an administrator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It should be noted that although the disclosure has been described with respect to SAML, the present disclosure is not constrained to this particular protocol and that the techniques described herein may be applied to other standard authentication and authorization protocols, such as OAuth, OpenID Connect, Facebook Connect, Auth0 and the like.

What is claimed:

1. A system, comprising:
   at least one processor and a memory coupled to the at least one processor;
   wherein the at least one processor is configured to:
   generate, by an identity provider, a configuration Single Sign-On (SSO) script to automatically configure single sign-on settings of a service provider in a user interface, wherein the single sign-on settings are tailored for an authentication and authorization protocol utilized by the service provider, wherein the configuration SSO script is based on a template associated with the service provider, the template containing a layout of the user interface used to configure the single sign-on settings; and
   facilitate execution of the configuration SSO script to automatically configure the SSO settings in the service provider.

2. The system of claim 1, wherein the authentication and authorization protocol uses Security Assertion Markup Language (SAML) protocol.

3. The system of claim 1, wherein a browser extension executes the configuration SSO script.

4. The system of claim 1, wherein a trusted third party executes the configuration SSO script.

5. The system of claim 1, wherein the at least one processor is further configured to:
   capture manual actions of a user inputting the single sign-on settings; and
   use the captured single sign-on settings in the template.

6. The system of claim 1, wherein the at least one processor is further configured to:
   capture the layout of the user interface from a browser; and
   use the captured layout in the template.

7. The system of claim 1, wherein the at least one processor is further configured to:
  upon successful completion of the configuration of the single sign-on settings in the service provider, provide notification of the successful completion.

8. The system of claim 1, wherein the at least one processor is further configured to:
  monitor for a change made to the layout of the user interface; and
  upon detection of the change, update the template to reflect the change.

9. A method, comprising:
  detecting, at an identity provider including at least one processor and a memory, a layout of a configuration Single Sign-On (SSO) web page of a service provider, the layout including at least one HyperText Markup Language (HTML) element and at least one Cascading Style Sheets (CSS) element, the configuration SSO web page of the service provider including settings for an authentication and authorization protocol between the identity provider and the service provider;
  generating a template including the layout;
  creating a configuration SSO script using the template, the configuration SSO script including instructions that automatically fill in settings rendered in the configuration SSO web page;
  monitoring for at least one change to the template; and
  upon detection of the at least one change, updating the template.

10. The method of claim 9, further comprising:
  transmitting the configuration SSO script to a principal of the identity provider for execution.

11. The method of claim 10, prior to executing the configuration SSO script, enabling administrator access to the service provider.

12. The method of claim 9, further comprising:
  transmitting the configuration SSO script to a trusted third party to execute the configuration SSO script.

13. The method of claim 12, wherein the trusted third party acts on behalf of an administrator of a principal who is associated with the identity provider.

14. The method of claim 9, wherein the settings are associated with Security Assertion Markup Language (SAML) protocol.

15. The method of claim 9, wherein the settings require configuration from an administrator.

16. A device, comprising:
  one or more processors communicatively connected to a memory;
  the memory including instructions that when executed on the one or more processors perform actions that:
  store a plurality of templates, a template associated with a service provider, the template including information on a design of a web page, the web page including configuration settings of an authentication and authorization protocol used with the service provider;
  generate a configuration Single Sign-On (SSO) script for a select service provider based on a template associated with the select service provider, the configuration SSO script including instructions to automatically fill in the configuration settings on a rendered web page; and
  initiate execution of the configuration SSO script to a third party.

17. The device of claim 16, wherein the third party is an administrator of a principal associated with the service provider.

18. The device of claim 16, wherein the third party is a trusted third party that executes the configuration SSO script on behalf to an administrator of a principal associated with the service provider.

19. The device of claim 16, wherein the authentication and authorization protocol is Security Assertion Markup Language (SAML) protocol.

20. The device of claim 16, wherein the memory includes further instructions that update a template upon detection of a change made to the design of the web page.

* * * * *